(12) United States Patent
Rahman et al.

(10) Patent No.: US 10,622,691 B2
(45) Date of Patent: Apr. 14, 2020

(54) ANODE COMPOSITE STRUCTURE FOR LITHIUM-AIR BATTERY

(71) Applicant: Suzuki Motor Corporation, Hamamatsu-Shi (JP)

(72) Inventors: Khalilur Rahman, Hamamatsu (JP); Hiroaki Izumi, Hamamatsu (JP); Masaya Nomura, Hamamatsu (JP); Hironari Minami, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 16/086,531

(22) PCT Filed: Mar. 31, 2017

(86) PCT No.: PCT/JP2017/013610
§ 371 (c)(1),
(2) Date: Sep. 19, 2018

(87) PCT Pub. No.: WO2017/187888
PCT Pub. Date: Nov. 2, 2017

(65) Prior Publication Data
US 2019/0103642 A1 Apr. 4, 2019

(30) Foreign Application Priority Data
Apr. 25, 2016 (JP) .................. 2016-087103

(51) Int. Cl.
*H01M 12/06* (2006.01)
*H01M 2/18* (2006.01)
*H01M 4/70* (2006.01)
(Continued)

(52) U.S. Cl.
CPC ......... *H01M 12/06* (2013.01); *H01M 2/0255* (2013.01); *H01M 2/1673* (2013.01);
(Continued)

(58) Field of Classification Search
CPC ...... H01M 12/06; H01M 12/08; H01M 8/134; H01M 8/382; H01M 8/405
See application file for complete search history.

(56) References Cited

U.S. PATENT DOCUMENTS

2011/0003201 A1 1/2011 Tsukagoshi et al.
2012/0032968 A1 2/2012 Fan et al.
(Continued)

FOREIGN PATENT DOCUMENTS

JP S62020263 A 1/1987
JP H05325948 A 12/1993
(Continued)

OTHER PUBLICATIONS

International Search Report of International Application No. PCT/JP2017/013610, dated Jun. 20, 2017.
(Continued)

*Primary Examiner* — Jimmy Vo
(74) *Attorney, Agent, or Firm* — Lerner, David, Littenberg, Krumholz & Mentlik, LLP (57) ABSTRACT

An objective is to provide an anode composite structure for use in a lithium-air battery to make the lithium-air battery less likely to degrade in charge-discharge performance. Provided is an anode composite structure for a lithium-air battery, including: an anode current collector; an anode layer stacked on the anode current collector, the anode layer being metallic lithium, an alloy containing lithium as a main component, or a chemical compound containing lithium as a main component; and a separator stacked on the anode layer. The anode layer is sealed in by the separator and the anode current collector.

4 Claims, 8 Drawing Sheets

(51) Int. Cl.
  *H01M 4/66* (2006.01)
  *H01M 4/38* (2006.01)
  *H01M 2/16* (2006.01)
  *H01M 2/02* (2006.01)
  *H01M 4/40* (2006.01)
  *H01M 4/134* (2010.01)
  *H01M 4/02* (2006.01)
  *H01M 12/08* (2006.01)

(52) U.S. Cl.
  CPC ............ *H01M 2/18* (2013.01); *H01M 4/134* (2013.01); *H01M 4/382* (2013.01); *H01M 4/405* (2013.01); *H01M 4/66* (2013.01); *H01M 4/70* (2013.01); *H01M 12/08* (2013.01); *H01M 2004/027* (2013.01); *Y02E 60/128* (2013.01)

(56) References Cited

U.S. PATENT DOCUMENTS

2012/0100440 A1    4/2012    Narula et al.
2014/0162108 A1*   6/2014    Visco .................... H01M 4/13
                                                          429/131
2014/0170465 A1    6/2014    Visco et al.
2014/0234732 A1    8/2014    Park et al.
2015/0372358 A1    12/2015   Izumi et al.

FOREIGN PATENT DOCUMENTS

| | | |
|---|---|---|
| JP | 2010161059 A | 7/2010 |
| JP | 2010-192313 A | 9/2010 |
| JP | 2011146339 A | 7/2011 |
| JP | 2013157289 A | 8/2013 |
| JP | 2016004714 A | 1/2016 |
| JP | 2016009525 A | 1/2016 |
| JP | 2016046039 A | 4/2016 |
| WO | 2009157206 A1 | 12/2009 |

OTHER PUBLICATIONS

Extended European Search Report for Application No. 17789176.9 dated Mar. 1, 2019, 7 pages.

* cited by examiner

ANODE COMPOSITE STRUCTURE FOR LITHIUM-AIR BATTERY

CROSS-REFERENCE TO RELATED APPLICATIONS

The present application is a national phase entry under 35 U.S.C. § 371 of International Application No. PCT/JP2017/013610, filed Mar. 31, 2017, published in Japanese, which claims priority from Japanese Patent Application No. 2016-087103, filed Apr. 25, 2016, the disclosures of which are hereby incorporated herein by reference.

TECHNICAL FIELD

The present invention relates to an anode composite structure for use in a lithium-air battery.

BACKGROUND ART

In recent years, metal-air batteries have been proposed as next-generation batteries that provide higher energy density than conventional lithium-ion batteries. A metal-air battery is a battery that uses metal as an anode active material and oxygen in the air as a cathode active material. It is said that a metal-air battery theoretically yields more energy per unit weight when metallic lithium is used as its anode active material, and such a configuration is particularly a focus of attention. Such an air-metal battery using metallic lithium as an anode active material is called a lithium-air battery.

Lithium-air batteries are roughly grouped into two types: ones using an aqueous electrolyte inside and ones using a non-aqueous electrolyte inside. Lithium-air batteries using an aqueous electrolyte have the advantage of being less susceptible to moisture in the air than the ones using a non-aqueous electrolyte. However, metallic lithium used as an anode active material reacts chemically by coming into contact with oxygen or water and therefore needs to be isolated from the atmosphere or an aqueous solution. For this isolation, a method has been proposed to provide, for example, a solid electrolyte that conducts lithium ions as an isolation layer.

For example, Patent Document 1 discloses a lithium-air battery using an aqueous electrolyte and having an anode composite in which a polymer electrolyte buffer layer is formed on one side of a metallic lithium plate and is then covered with a glass ceramic that conducts lithium ions.

REFERENCE DOCUMENT LIST

Patent Document

Patent Document 1: JP 2010-192313 A

SUMMARY OF THE INVENTION

Problem to be Solved by the Invention

To put lithium-air batteries like the one disclosed in Patent Document 1 into practical use, metallic lithium for use as the anode active material is placed on a metal that serves as an anode terminal (an anode current collector). After a lithium-air battery of such a configuration undergoes multiple cycles of charge and discharge, dendrites of metallic lithium may be deposited onto part of the anode terminal (e.g., the back surface) during charging. Further, minute lithium powder (dead lithium) may be produced by breakage of the tips of the dendrites and dispersed in the electrolytic solution. The lithium powder thus dispersed drifts away from the anode terminal and floats, and therefore no longer contributes to the charge and discharge. Consequently, as the dead lithium increases, the charge-discharge performance of the lithium-air battery gradually degrades.

In view of the above circumstances, the present invention has an objective to provide an anode composite structure for use in a lithium-air battery that makes the lithium-air battery less likely to degrade in charge-discharge performance.

Means for Solving the Problem

To achieve the above objective, an anode composite structure for a lithium-air battery according to an aspect of the present invention comprises: an anode current collector; an anode layer stacked on the anode current collector, the anode layer being metallic lithium, an alloy containing lithium as a main component, or a chemical compound containing lithium as a main component; and a separator stacked on the anode layer, wherein the anode layer is sealed in by the separator and the anode current collector.

Effects of the Invention

The present invention can provide an anode composite structure for use in a lithium-air battery which makes the lithium-air battery less likely to degrade in charge-discharge performance.

MODE FOR CARRYING OUT THE INVENTION

Embodiments of the anode composite structure for a lithium-air battery according to the present invention are described below in detail and in concrete terms with reference to the accompanying drawings.

First Embodiment

Figure 1:
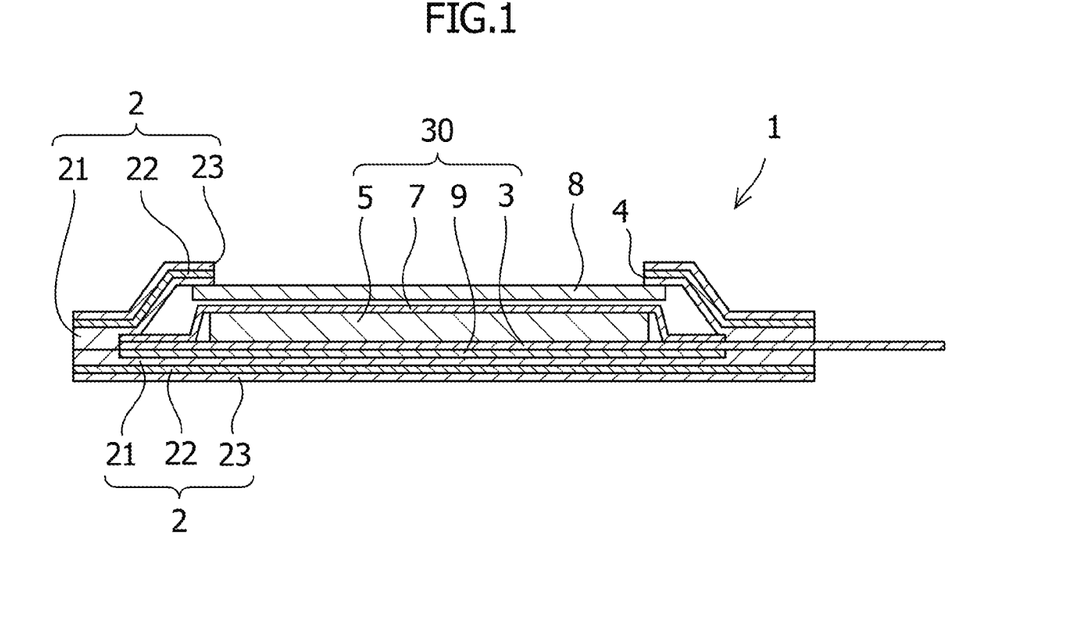
FIG. 1 is a sectional view of an anode composite for a lithium-air battery according to a first embodiment.

First, an anode composite structure for a lithium-air battery according to a first embodiment is described using FIG. 1. As illustrated in FIG. 1, an anode composite 1 for a lithium-air battery according to the first embodiment has a stacking structure in which upper and lower metallic foil laminated films 2, 2 sandwich a solid electrolyte 8 and an anode 30. The upper metallic foil laminated film 2 in FIG. 1 is a sheet made up of three layers: a resin layer 21, a metallic foil layer 22, and a resin layer 23 stacked in the order mentioned from inside (down in FIG. 1) to outside (up in FIG. 1). Similarly, the lower metallic foil laminated film 2 in FIG. 1 is a sheet made up of three layers: a resin layer 21, a metallic foil layer 22, and a resin layer 23 stacked in the order mentioned from inside (up in FIG. 1) to outside (down in FIG. 1).

The upper metallic foil laminated film 2 in FIG. 1 is provided with an opening 4 at its center or almost center. The opening 4 is square when seen from above in FIG. 1. The solid electrolyte 8 is disposed below the opening 4 of the metallic foil laminated film 2. The solid electrolyte 8 herein refers to a solid substance that permits ions (lithium ions) to pass therethrough when applied with voltage. In this embodiment, the solid electrolyte 8 is shaped like a relatively thin plate. The size of the upper surface of the solid electrolyte 8 is slightly larger than the opening 4 in the metallic foil laminated film 2. Thereby, the solid electrolyte 8 plugs the opening 4.

Below the solid electrolyte 8 in FIG. 1, the anode 30 is disposed. The anode 30 is fixed with all its four side end portions in FIG. 1 being sandwiched by the upper and lower metallic foil laminated films 2 and welded.

Figure 2:
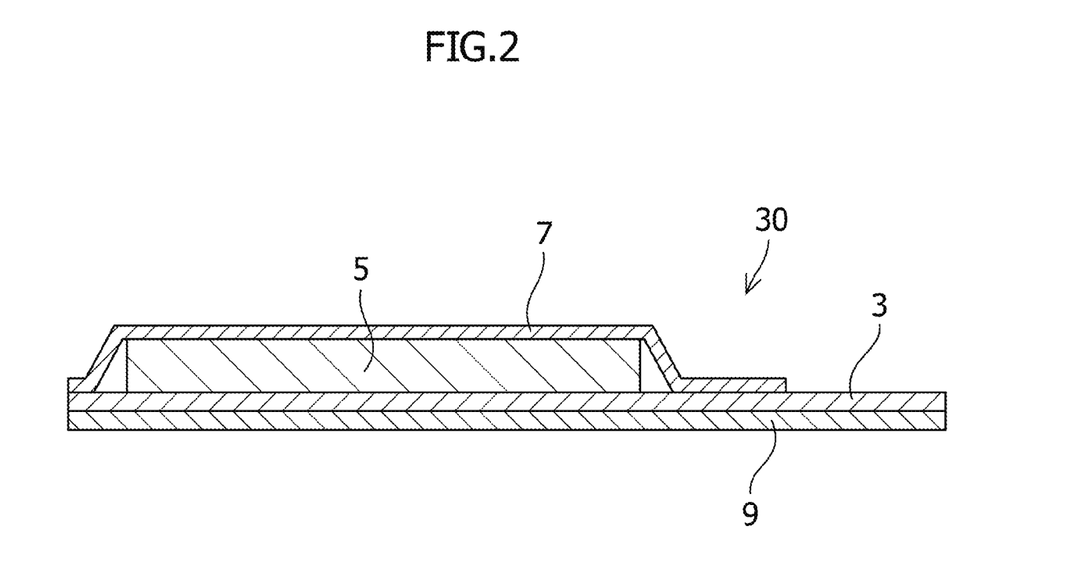
FIG. 2 is a diagram enlarging a section of an anode in the lithium-air battery according to the first embodiment.

FIG. 2 is a diagram magnifying the anode 30 in FIG. 1. As illustrated in FIG. 2, the anode 30 is structured as a quadruple-layer stack of, from down to up in FIG. 2, a film 9, an anode current collector 3, an anode layer 5 (metallic lithium), and a separator 7. The film 9 covers the lower surface of the anode current collector 3. Although not illustrated in FIGS. 1 and 2 since they are sectional views, the anode layer 5 is sealed in by the anode current collector 3 and the separator 7. This structure will be further specified by descriptions given later with reference to FIG. 3.

The separator 7 has properties that pass an electrolyte to be described later and conduct lithium ions. Further, the separator 7 is joined at its left and right end surfaces in FIG. 2 to the anode current collector 3. The separator 7 is also joined to the anode current collector 3 at its end portion at the near side in FIG. 2 and its end portion at the far side in FIG. 2, and by thus being joined at all the four sides, seals the anode layer 5 on the surface of the anode current collector 3. With such a configuration, the anode layer 5 is isolated from and is in no direct contact with the solid electrolyte 8. Note that a small amount of electrolyte (such as, for example, a non-aqueous electrolytic solution, an organic electrolytic solution, or a polymer electrolyte) is sealed in the space between the anode current collector 3 and the metallic foil laminated film 2.

Figure 3:
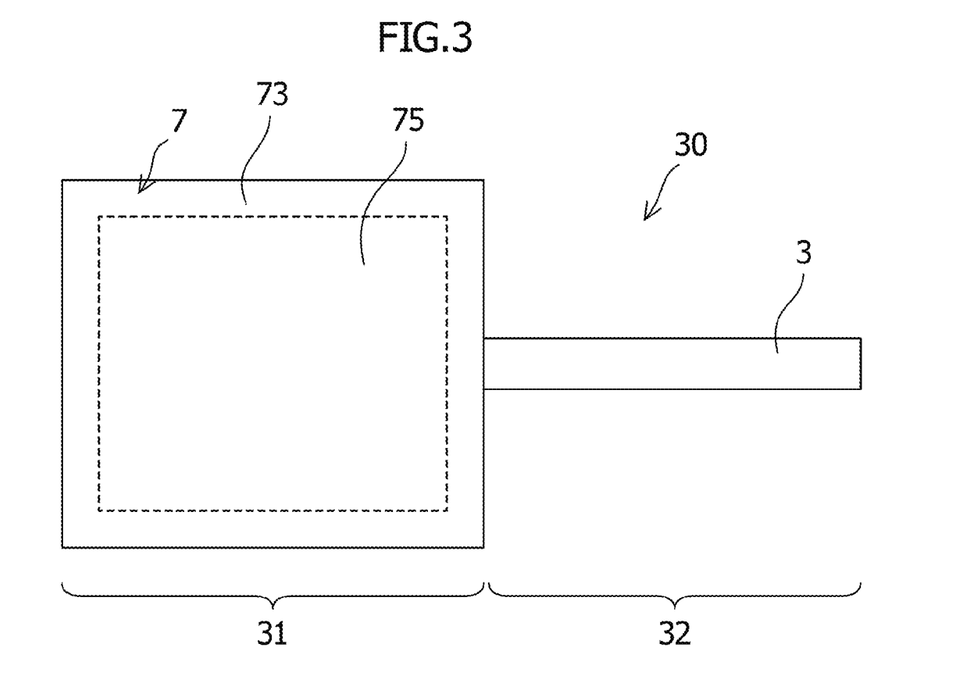
FIG. 3 is a plan view of the anode in the lithium-air battery according to the first embodiment.

FIG. 3 is a diagram of the anode 30 seen from above in FIG. 2. As illustrated in FIG. 3, the anode current collector 3 has a current collecting portion 31 located on the left hand in FIG. 3 and a terminal portion 32 located on the right hand in the drawing. The current collecting portion 31 has the shape of a square whose area is larger than the terminal portion 32. On the current collecting portion 31, the anode layer 5 and the separator 7 are stacked.

Meanwhile, the separator 7 is joined to the anode current collector 3 at a joint portion 73. Note that in a non-joint portion 75 not joined to the anode current collector 3, the anode layer 5 is sealed in between the separator 7 and the anode current collector 3. This forms a sealing structure of the anode layer 5. The size of the anode layer 5 is comparable to or slightly smaller than that of the non-joint portion 75. Note that as illustrated in FIG. 1, the non-joint portion 75 is located at a position that almost coincides with the solid electrolyte 8 provided in an upper part of FIG. 1.

Figure 4:
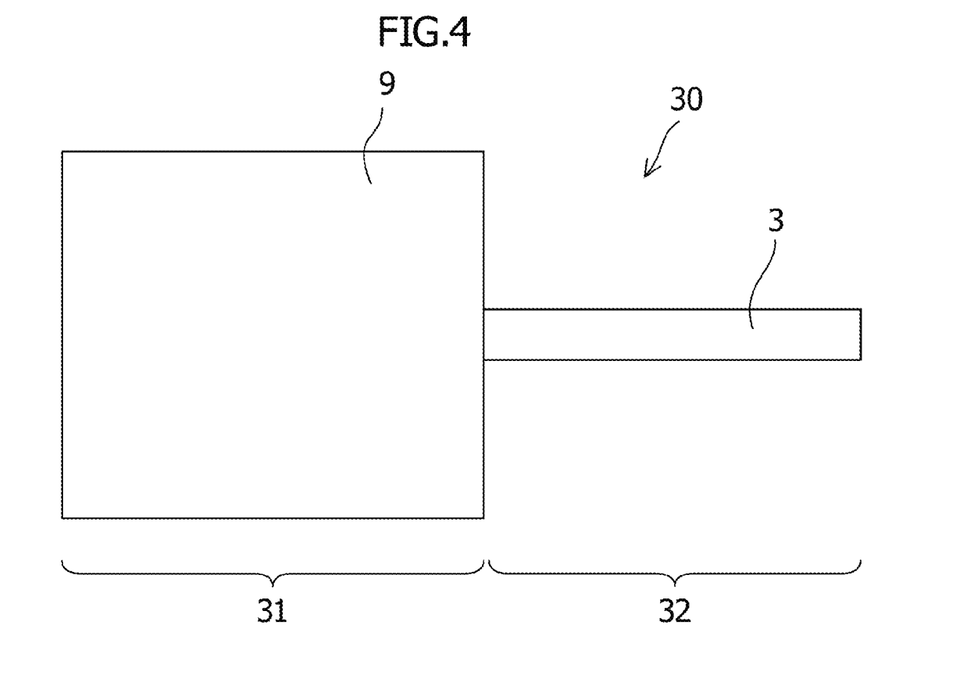
FIG. 4 is a bottom view of the anode in the lithium-air battery according to the first embodiment.

FIG. 4 is a diagram of the anode 30 seen from below in FIG. 2. As illustrated in FIG. 4, the current collecting portion 31 of the anode current collector 3 is covered with the film 9 over its entire surface. This film 9 is made of, for example, a resinous sheet that does not transmit an electrolytic solution therethrough and does not easily deteriorate because of an electrolytic solution.

If the anode composite 1 in FIG. 1 is used in a lithium-air battery, an air electrode (not shown) is placed above the solid electrolyte 8 in FIG. 1 and used. While this lithium air battery using the anode composite 1 is discharging, the anode layer 5 (metallic lithium) used in the anode 30 produces lithium ions ($Li^+$) and electrons ($e^-$) as shown in Chemical Formula 1. Then, the lithium ions ($Li^+$) are dissolved in the electrolytic solution, and the electrons ($e^-$) are supplied to the terminal portion 32 via the current collecting portion 31 of the anode current collector 3. Thus, changing the thickness and the area of the anode layer 5 enables control of a design value for the battery capacity.

$$Li \rightarrow Li^+ + e^- \qquad \text{[Chem. 1]}$$

Further, at a cathode (not shown), electrons are supplied, and oxygen and water in the air react with each other, producing hydroxyl ions ($OH^-$) (Chemical Formula 2). The hydroxyl ions ($OH^-$) then react with the lithium ions ($Li^+$) at the cathode, producing lithium hydroxide (LiOH).

$$O_2 + 2H_2O + 4e^- \rightarrow 4OH^- \qquad \text{[Chem. 2]}$$

On the other hand, while the lithium-air battery is charging, at the anode 30, lithium ions supplied from the cathode pass through the solid electrolyte 8 and the separator 7 and reach the surface of the current collecting portion 31 of the anode current collector 3, causing a metallic lithium deposition reaction (Chemical Formula 3).

$$Li^+ + e^- \rightarrow Li \qquad \text{[Chem. 3]}$$

In this regard, as illustrated in FIG. 3, the separator 7 is joined to the current collecting portion 31 at the joint portion 73. Thus, at this joint portion 73, the surface of the current collecting portion 31 is not exposed, and the metallic lithium deposition reaction does not occur. Hence, the metallic lithium deposition reaction occurs only at the non-joint portion 75 in FIG. 3.

The back surface of the current collecting portion 31, on the other hand, is covered with the film 9, as illustrated in FIG. 4. Thus, at the back surface, the electrolytic solution does not reach the back surface of the current collecting portion 31, and consequently, a metallic lithium deposition reaction does not occur.

If the back surface of the current collecting portion 31 were not covered with the film 9, dendrites would be deposited on this back surface. Then, breakage of the tips of the dendrites would produce minute lithium powder, which would be then dispersed in the electrolytic solution. The minute lithium powder thus dispersed would not contribute to charge and discharge, and consequently degrade the charge-discharge performance of the lithium-air battery.

In contrast, the structure of the anode composite according to this embodiment eliminates or reduces production of such dead lithium, and therefore can provide a lithium-air battery with high performance.

Further, at the cathode, an oxygen evolution reaction occurs, as shown in Chemical Formula 4.

[Chem. 4]

Now, descriptions are given below of materials of which the parts used in the first embodiment are made.

The resin layer 21 in the metallic foil laminated film 2 may use polyolefin resins such as a polypropylene resin or a polyethylene resin. These resins have low melting points, are easily thermally processed, and are suitable for heat sealing, thus facilitating manufacture of the anode composite 1.

The metallic foil layer 22 provided to the metallic foil laminated film 2 to enhance gas barrier performance and strength may use an metallic foil, such as an aluminum foil, an SUS foil, or a copper foil.

The resin layer 23 may use polyester resins such as a polyethylene terephthalate resin, or nylon resins. These resin materials have high thermal resistance and high strength, and thus can enhance the durability, thermal resistance, strength, and the like of the anode composite 1.

Although having a triple-layer structure in the first embodiment, the metallic foil laminated film 2 may have a structure with four or more layers by interposing, for example, one or more resin films, such as nylon films, between the layers.

The solid electrolyte 8 may use, for example, a glass ceramic, which has high lithium ion conductivity and is nonflammable. Particularly when an aqueous electrolytic solution is used as the electrolytic solution, the solid electrolyte 8 may use an LATP glass-ceramic electrolyte, which has high resistance to water. LATP is an oxide having a NASICON crystal structure and made up of Li, Ti, Al, P, Si, O, and the like.

The film 9 may use, for example, a resinous sheet that is durable against an electrolytic solution (an organic electrolytic solution), such as polypropylene or polyethylene. Note that the film 9 is joined to the entire back surface of the current collecting portion 31 of the anode current collector 3. Alternatively, the film 9 may be joined only at a peripheral portion, or may cover not only the back surface of the anode current collector 3, but also the side surface (the end portion) thereof.

The separator 7 may be, for example, a sheet made of a material such as cellulose or porous polyolefin resins such as polyethylene or polypropylene used as a separator for lithium-ion batteries and the like. In addition to these materials, possible materials for the separator 7 include porous aramid, polytetrafluoroethylene, and capillary aluminum oxides. Such a separator impregnated with an electrolytic solution (a non-aqueous electrolytic solution, an organic electrolytic solution), a polymer electrolyte, or the like may be used.

The separator used may have a porosity of approximately 40 to 90% and a thickness of approximately 10 to 300 μm, or more preferably approximately 15 to 100 μm. The pore size may be approximately 20 to 500 nm, or more preferably approximately 20 to 70 nm. Moreover, it is preferable when the separator 7 itself have certain levels of rigidity and strength.

In case of a non-aqueous electrolytic solution, the electrolytic solution may use, for example: as a solvent, a mixture of organic solvents of carbonate esters such as PC (propylene carbonate), EC (ethylene carbonate), DMC (dimethyl carbonate), and EMC (ethyl methyl carbonate), or an ether type solvent of such as ethylene glycol dimethyl ether, tetraethylene glycol dimethyl ether, or triethylene glycol dimethyl ether; and as an additive to the solvent, an electrolyte such as $LiPF_6$ (lithium hexafluorophosphate), $LiCLO_4$ (lithium perchlorate), $LiBF_4$ (lithium tetrafluoroborate), LiTFSI (lithium bis(trifluoromethanesulfonyl)imide), or LiFSI (lithium bis(fluorosulfonyl)imide). In the case of an aqueous electrolytic solution, examples of a lithium salt to dissolve in the water include LiCl (lithium chloride), LiOH (lithium hydroxide), $LiNO_3$ (lithium nitrate), and $CH_3COOLi$ (lithium acetate), and their mixed solution or the like may be used.

Note that a usable cathode (not shown) may be formed, for example by mixing a noble metal that exhibits a catalytic activity, such as platinum, gold, iridium, or ruthenium, or an oxide thereof, or manganese dioxide or the like that exhibits a catalytic activity with highly conductive carbon or the like as a conductivity aid and polyvinylidene fluoride, polytetrafluoroethylene, or styrene-butadiene rubber as a binder to obtain a material in which fine particles of a noble metal such as platinum or gold are supported on conductive carbon black or a mixture of a material that exhibits a catalytic activity, such as $MnO_2$, and a conduction aid such as carbon black; and then by supporting the material or mixture thus obtained on a conductive, gas-diffusive material (air electrode current collector). The air electrode current collector may use, for example, carbon paper, carbon cloth, carbon non-woven cloth, or a metal mesh material made of a metal highly resistant to corrosion, such as porous nickel (foamed nickel), porous aluminum (foamed aluminum), nickel, titanium, stainless steel, Cu, Ti, or SUS. The carbon cloth herein refers to a cloth sheet formed by woven carbon fibers or the like, and the carbon non-woven cloth refers to a sheet formed by randomly entangled carbon fibers or the like. Note that when an aqueous electrolytic solution is used as the electrolytic solution, the air electrode current collector needs resistance to corrosion against the electrolytic solution as well. For this reason, carbon fiber or the like can be favorably used due to its high conductivity, high resistance to both acidic and alkaline aqueous solutions, and light weight. A metal mesh material is suitable for pressure attachment of the cathode material. Among the materials for the metal mesh material, a Ti mesh material is particularly suitable as an air electrode current collector at the cathode because Ti is highly resistant to corrosion against an alkaline aqueous solution, is lightweight, and is less expensive than noble metals highly resistant to corrosion, such as platinum and gold. For the reasons above, a Ti mesh material is used in the examples herein.

Second Embodiment

Figure 5:
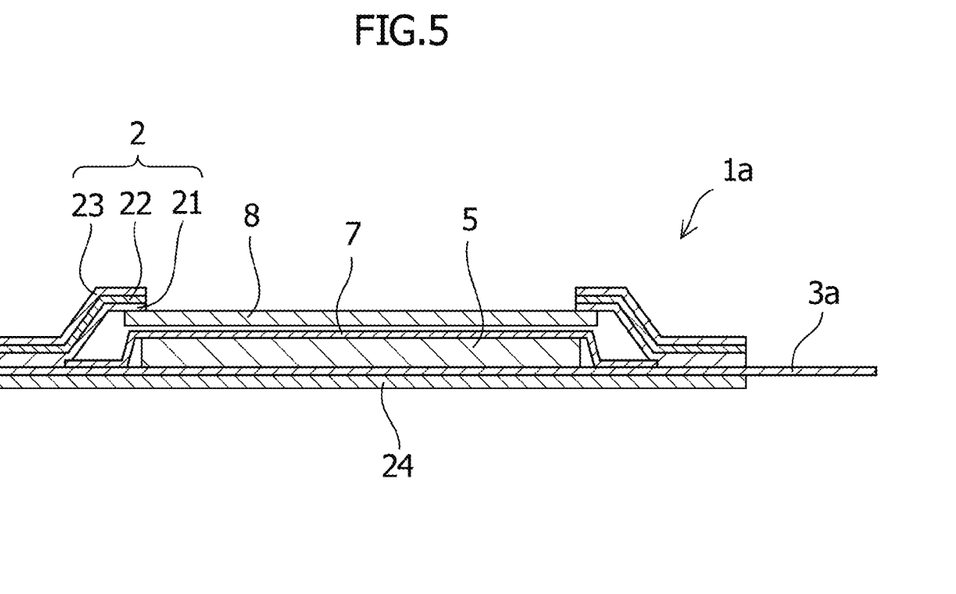
FIG. 5 is a sectional view of an anode composite for a lithium-air battery according to a second embodiment.

Using FIG. 5, a description is given of the anode composite structure for a lithium-air battery according to a second embodiment. Since the second embodiment is a modification of the first embodiment (FIGS. 1 to 4), repeated descriptions are omitted, and only differences are detailed.

A anode composite 1a according to the second embodiment does not have the lower metallic foil laminated film 2 in FIG. 1 that the anode composite 1 described in the first embodiment has. Instead, the lower surface (in FIG. 5) of an anode current collector 3a is entirely covered with a resinous sheet which is high in thermal resistance and strength, such as polyester resins including a polyethylene terephthalate resin, or nylon resins.

Like the first embodiment, the structure of the second embodiment also can prevent lithium ions from travelling around to the back surface of the anode current collector 3a when the lithium-air battery is charging. This can eliminate or reduce dendrites produced on the back surface of the anode current collector 3a. Note that a resin layer 24 of the second embodiment in a lower part in FIG. 5 may use the same material as the resin layer 23 in the metallic foil laminated film 2.

Third Embodiment

Figure 6:
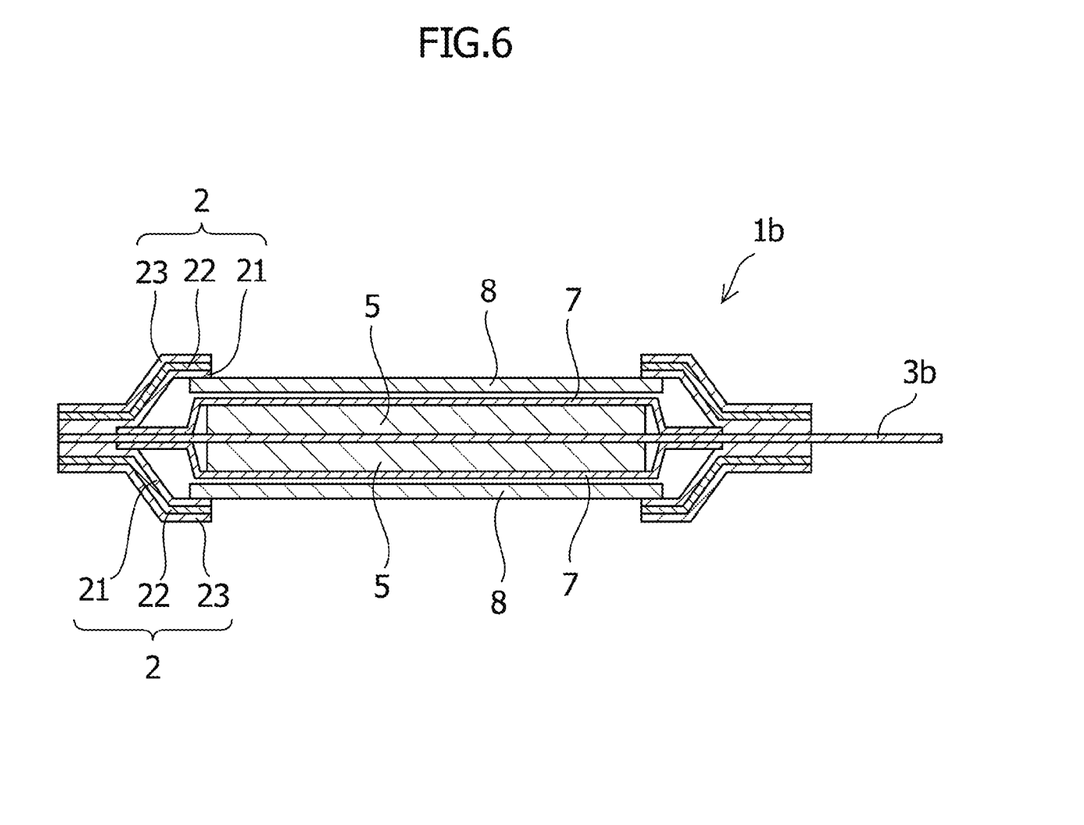
FIG. 6 is a sectional view of an anode composite for a lithium-air battery according to a third embodiment.

Using FIG. 6, a description is given of the anode composite structure for a lithium-air battery according to a third embodiment. Since the third embodiment is a modification of the first embodiment (FIGS. 1 to 4), overlapping descriptions are omitted, and only differences are detailed.

As illustrated in FIG. 6, an anode composite 1b according to the third embodiment has the anode layer 5, the separator 7, the solid electrolyte, and the metallic foil laminated film 2 on both upper and lower sides of an anode current collector 3b.

Such a structure does not need the film 9 to cover the back surface of the anode current collector 3b and the metallic foil laminated film 2 to cover the back surface of the anode composite 1b. This allows the anode composite 1b and a lithium-air battery employing the same to be smaller in volume and weight.

Fourth Embodiment

Figure 7:
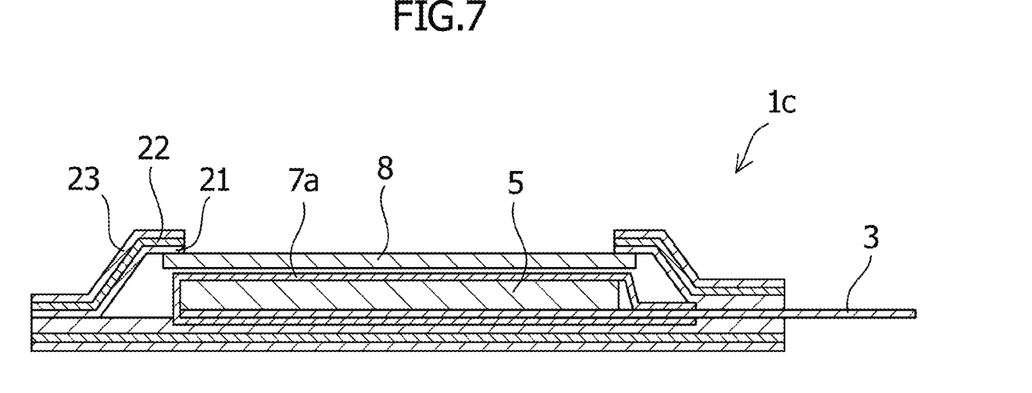
FIG. 7 is a sectional view of an anode composite for a lithium-air battery according to a fourth embodiment.

Using FIG. 7, a description is given of the anode composite structure for a lithium-air battery according to a fourth embodiment. Since the fourth embodiment is a modification of the first embodiment (FIGS. 1 to 4), overlapping descriptions are omitted, and only differences are detailed.

As illustrated in FIG. 7, an anode composite 1c according to the fourth embodiment has a structure such that a separator 7a stacked on the anode layer 5 in FIG. 7 is folded back at the left edge of the anode current collector 3 in FIG. 7 onto the lower side of the anode current collector 3. Further, the separator 7a covers the entire back surface of the anode current collector 3 (a portion corresponding to the current collecting portion in FIG. 3) inside the anode composite 1c. Although it is not clear from the sectional view of FIG. 7, the separator 7a is folded back from the upper surface of the anode layer 5 to the back surface of the anode current collector 3 also at end portions of the anode current collector 3 at the far side and the near side in FIG. 7, like the left end portion of the anode current collector 3.

The separator 7a is joined to the anode current collector 3 at the back surface of the anode current collector 3. Such a structure allows metallic lithium to be effectively retained on the surface of the anode current collector 3 during charge. This therefore eliminates or reduces dead lithium produced and dispersed inside the anode composite 1c, enabling provision of a lithium-air battery with high charge-discharge performance.

Fifth Embodiment

Using FIGS. 11 to 14, a description is given of the anode composite structure for a lithium-air battery according to a fifth embodiment. Since the fifth embodiment is a modification of the first embodiment (FIGS. 1 to 4), repeated descriptions are omitted, and only differences are detailed.

Figure 11:
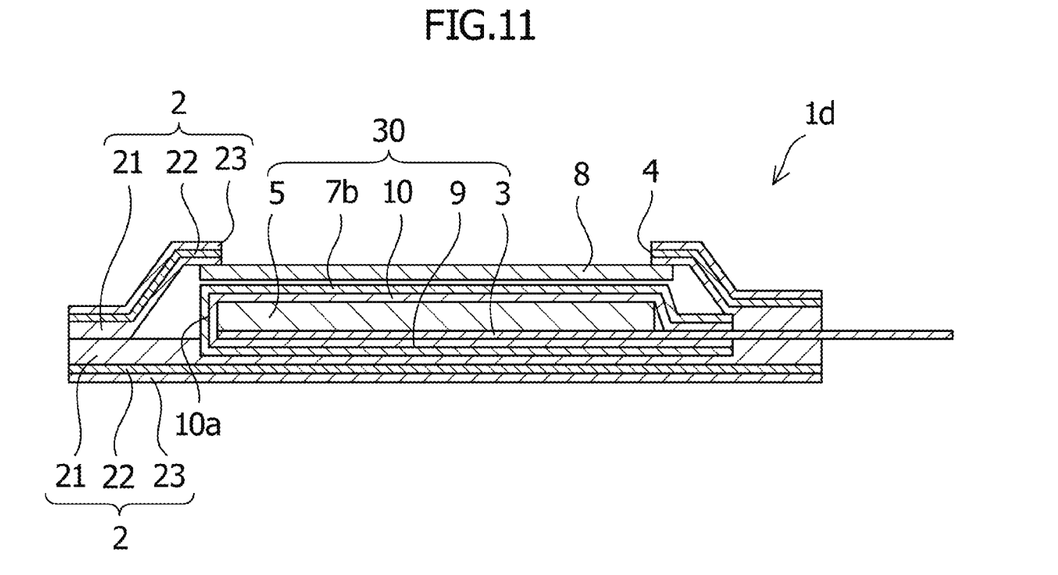
FIG. 11 is a sectional view of an anode composite for a lithium-air battery according to a fifth embodiment.
Figure 12:
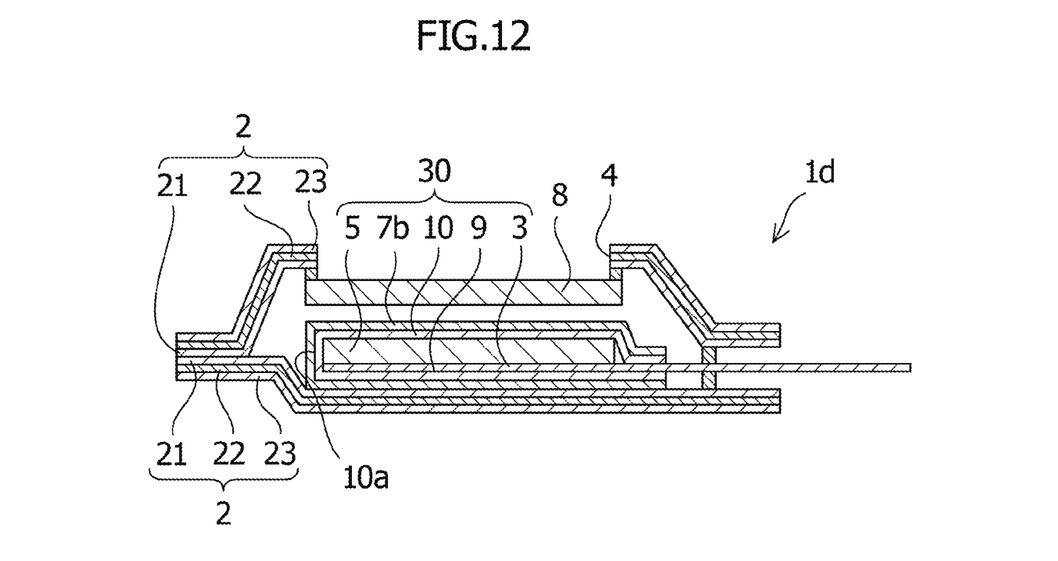
FIG. 12 is a sectional view magnifying an anode in the lithium-air battery according to the fifth embodiment.

As illustrated in FIGS. 11 and 12, a separator 7b in an anode composite 1d according to the fifth embodiment includes a conductive electron-conducting layer 10 on its inner side, i.e., the anode layer 5 side. Like the separator 7a illustrated in FIG. 7, the separator 7b is stacked on the anode layer 5 in FIGS. 11 and 12, is folded back at the left edge of the anode current collector 3 in FIGS. 11 and 12 onto the lower side of the anode current collector 3, and covers the entire back surface of the anode current collector 3 (a portion corresponding to the current collecting portion in FIG. 3) inside the anode composite 1d.

The electron-conducting layer 10 can be formed by coating of the inner side of the separator 7b with a conductive metal such as gold or platinum. Metal coating methods include vapor deposition or sputtering using Au or Pt as a target material. Instead of metal, the electron-conducting layer 10 may be formed by application of a conductive material such as carbon. Coating by a method such as vapor deposition or sputtering is preferable because it can give the separator 7b conductivity without clogging the pores, but the coating methods are not limited to a particular method.

Now, a description is given of the range to provide the electron-conducting layer 10. Metallic lithium powder deposited during charge may diffuse inside the whole bag of the separator 7b while increasing in volume. The electron-conducting layer 10 is preferably provided over the entire inner side of the separator 7b to allow continuity between the metallic lithium powder and the anode current collector 3. Thus, in FIGS. 11 and 12, the electron-conducting layer 10 is preferably extended to the vertically-extending part of the separator 7b at the left end of the anode 30, as an extension portion 10a.

Now, a description is given of the reason for providing the electron-conducting layer 10 only on the inner side of the separator 7b. If the electron-conducting layer 10 were provided on the outer side of the separator 7b as well, the entire body including the separator 7b would be an anode, and metallic lithium might be deposited not only inside the bag of the separator 7b, but also on the outside thereof. The whole reason to form the separator 7b into a bag shape and cover the metallic lithium anode layer 5 is to cause metallic lithium powder generated during charge to stay near the anode current collector 3. Thus, providing the electron-conducting layer 10 on the outside of the separator 7b makes it meaningless to cover the anode layer 5 with the separator 7b.

The anode composite 1d according to this embodiment having the above structure in which the surroundings of the anode layer 5 are covered with the bag-shaped separator 7b prevents direct contact between the solid electrolyte 8 and the anode layer 5 and makes it unlikely for minute powder of lithium generated during the charge and discharge cycles to be dispersed inside the anode composite 1d, reducing the amount of lithium that does not contribute to charge and discharge. Further, by the electron-conducting layer 10 provided to make the inner side of the separator 7b conductive, points of contact with the anode current collector 3 are increased. As a result of these effects, charge and discharge can be performed a larger number of times, and the charge-discharge performance can be enhanced even more.

Figure 13:
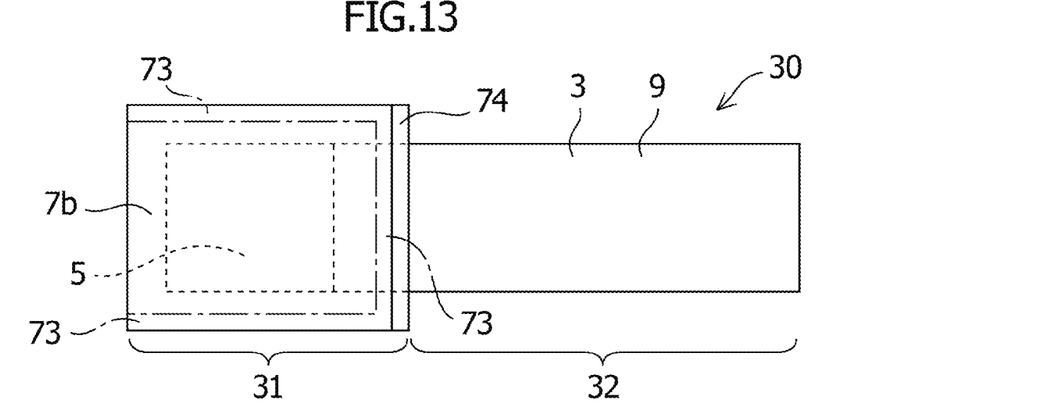
FIG. 13 is a plan view of the anode in the lithium-air battery according to the fifth embodiment.
Figure 14:
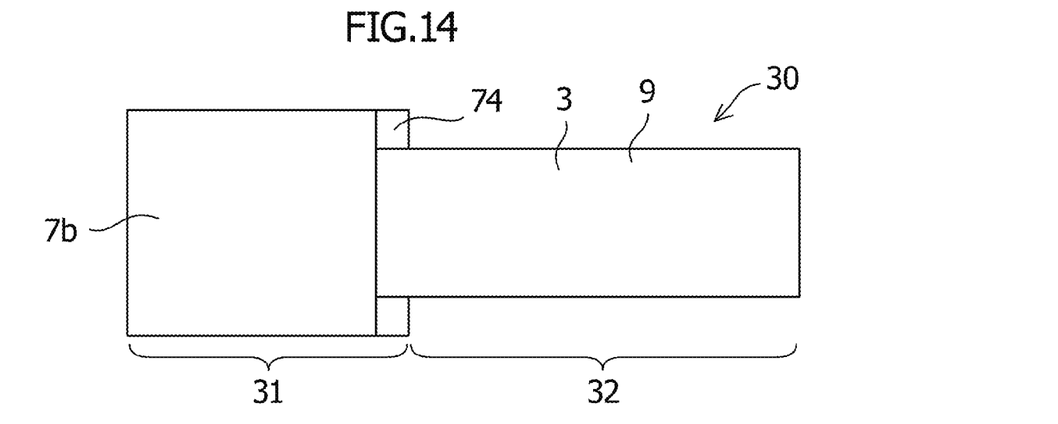
FIG. 14 is a bottom view of the anode in the lithium-air battery according to the fifth embodiment.

FIG. 13 is, like FIG. 3, a diagram of the anode 30 in FIG. 11 seen from above, and FIG. 14 is, like FIG. 4, a diagram of the anode 30 in FIG. 11 seen from below. The anode 30 also has the current collecting portion 31 located on the left hand in FIG. 13 and the terminal portion 32 located on the right hand in FIG. 13, and has almost the same configuration as that in FIGS. 3 and 4. The separator 7b illustrated in FIGS. 13 and 14 is a single sheet made of, for example, porous polyethylene or polypropylene. The separator 7b is folded, and with three sides of one folded part aligned with corresponding three sides of the other folded part, the one part of the folded separator is heat-sealed to the other part thereof at joint portions 73, 73, 73 to make the separator 7b bag-shaped. The anode layer 5 and part of the anode current collector 3 are inserted into the bag-shaped separator 7b, and the anode current collector 3 and the separator 7b are heat-sealed using a heat-sealing sheet 74, thereby sealing the current collecting portion 31. Note that the back surface of the anode current collector 3 is covered with a film (only the location of which is illustrated with reference sign 9, see FIG. 3 for details) like the one illustrated in FIGS. 3 and 4.

In this embodiment, the single separator 7b is folded near its center and formed into a bag to accommodate the anode 30 inside by being heat-sealed at its three sides on the edge portions. This configuration makes the work of inserting the anode layer 5 and part of the anode current collector 3 into the bag-shaped separator 7b easy and efficient, and moreover, enables lithium powder generated by charge and discharge to stay near the anode current collector 3 so as not to be dispersed inside the anode composite 1d. Thus, charge and discharge cycle characteristics are enhanced.

Further, in this embodiment, the anode layer 5 and the anode current collector 3 are wrapped by the separator 7b made of porous polyethylene or polypropylene, and the opening 4 is heat-sealed. With this configuration, even if the cell ruptures and water or the like enters, it will not be a large amount of water entering at once, and the reactivity of highly reactive lithium powder generated by charge and discharge is reduced to lower the risk of ignition or fire and enhance safety.

Furthermore, in this embodiment, the porous, resinous separator is interposed between the solid electrolyte 8 and the anode current collector 3 of the anode 30, and the anode 30 is wrapped with the bag-shaped separator 7b. This configuration prevents direct contact between the solid electrolyte 8 and the metallic lithium anode layer 5 to reduce leak of metallic lithium powder generated by charge and discharge, thereby preventing deterioration of the solid electrolyte 8 to enhance cell life and safety.

Moreover, in this embodiment, the back surface of the anode current collector 3 is covered with the resinous sheet 9 which is made of polypropylene, polyethylene, or the like and resistant to an organic electrolytic solution. This configuration can prevent metallic lithium to be deposited on the back surface of the anode current collector 3 during charge and discharge, and also increase the strength and rigidity of the anode 30 itself, thereby enhancing workability during the fabrication of the composite anode and durability of the current collector and terminal during charge and discharge. For example, the resinous sheet 9 may be made of, but not limited to, an acid-modified PP sheet or the same material for the resin layer 23 which is the surface of the metallic foil laminated film 2.

Sixth and Seventh Embodiments

Figure 15:
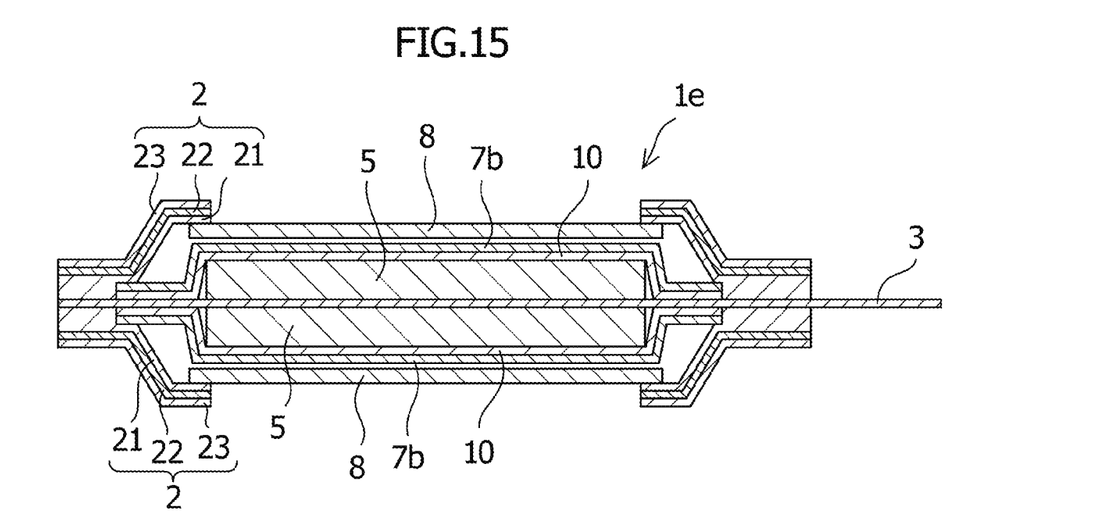
FIG. 15 is a sectional view of an anode composite for a lithium-air battery according to a sixth embodiment.
Figure 16:
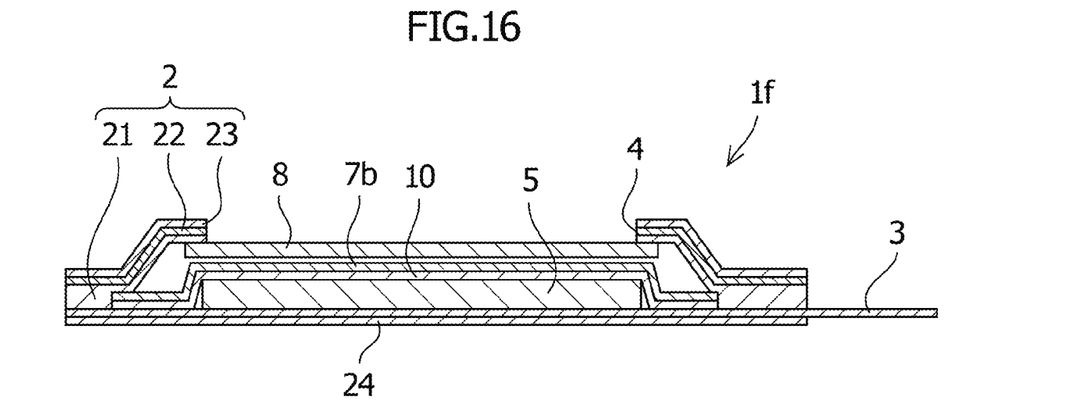
FIG. 16 is a sectional view of an anode composite for a lithium-air battery according to a seventh embodiment.

FIG. 15 illustrates the structure of an anode composite 1e for a lithium-air battery according to a sixth embodiment. The separator 7b of the anode composite 1e according to this embodiment is such that the separator 7 of the anode composite 1b illustrated in FIG. 6 has the electron-conducting layer 10 on its inner side. FIG. 16 illustrates the structure of an anode composite 1f for a lithium-air battery according to a seventh embodiment. The separator 7b of the anode composite 1f according to this embodiment is such that the separator 7 of the anode composite 1a illustrated in FIG. 5 has the electron-conducting layer 10 on its inner side. The other configurations of the anode composites 1e and 1f in FIGS. 15 and 16 are substantially the same as those illustrated in FIGS. 6 and 5, and are therefore not described again here. Note that in FIGS. 15 and 16, the right part of the anode current collector 3 protrudes out as a tab portion to be connected to a cable (not shown), whereas the left part thereof is sealed by the upper and lower metallic foil laminated films 2 with an acid-modified PP sheet interposed.

Other Modes

Figure 17:
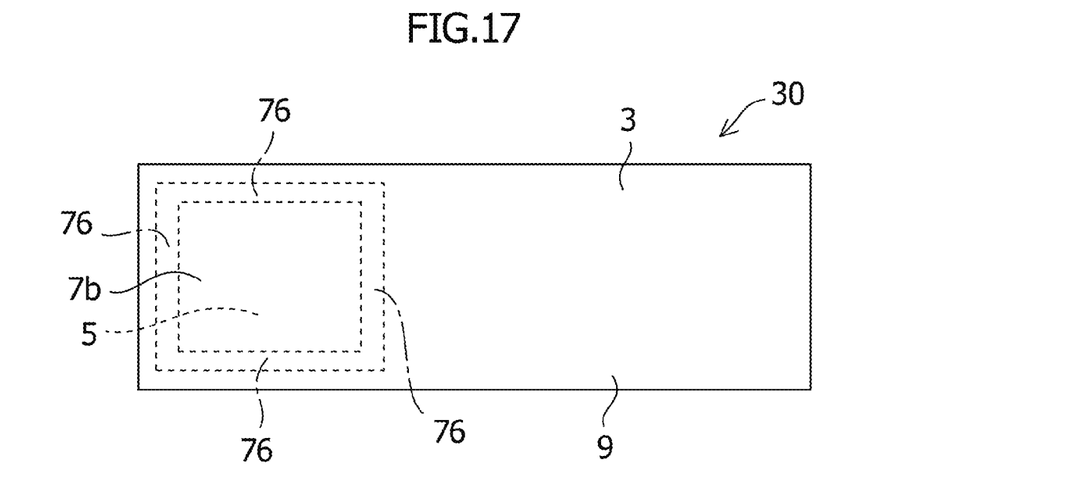
FIG. 17 illustrates an anode composite for a lithium-air battery according to another embodiment, and is specifically a plan view schematically showing a structure in which a separator is heat-sealed to an anode current collector.
Figure 18:
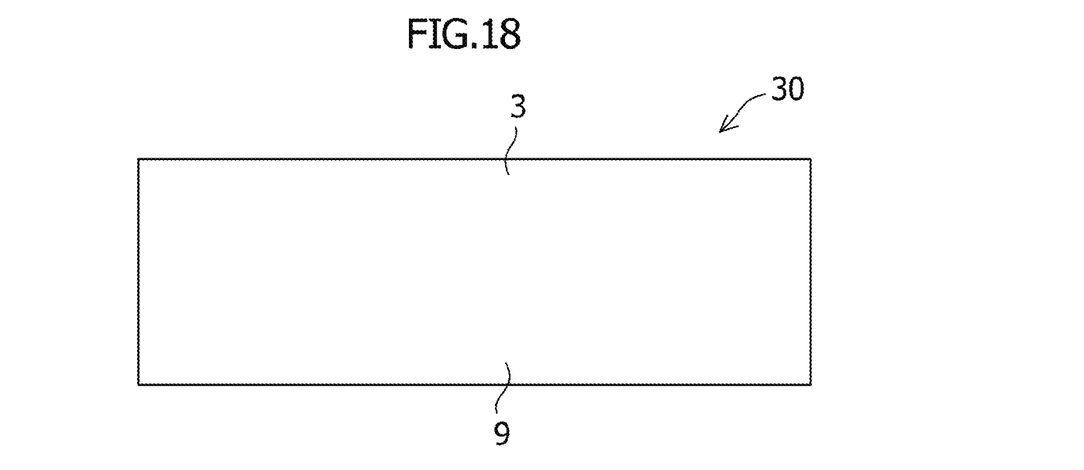
FIG. 18 illustrates the anode composite for a lithium-air battery according to another embodiment, and is specifically a bottom view schematically showing the structure in which the separator is heat-sealed to the anode current collector.

FIGS. 17 and 18 illustrate an example of the anode 30 of the anode composite 1f illustrated in FIG. 16, specifically depicting a schematic example of a state where the separator 7b is heat-sealed to the anode current collector 3. The anode 30 in FIGS. 17 and 18 is formed as follows. To a metal foil, such as a copper foil, integrally having an anode current collector and a terminal, a foil of the metallic lithium anode layer 5 the area of which is smaller than the anode current collector 3 is joined. The separator 7b made of porous polyethylene, polypropylene, or the like is stacked to cover the anode layer 5, and the end portions of the anode current collector 3 to which the anode layer 5 is not joined are heat-sealed. Note that the back surface of the anode current collector 3 is covered with the resinous sheet film 9 which is made of polypropylene, polyethylene, or the like and resistant to an organic electrolytic solution. The inner side of the separator 7b of this example is similarly provided with the electron-conducting layer 10 by gold or platinum coating.

The above-given descriptions of the embodiments are merely exemplary to illustrate an anode composite structure for a lithium-air battery according to the present invention, and are not intended to limit the present invention described in CLAIMS. Moreover, the configurations of the parts of the present invention are not limited to those described in the above embodiments, and are variously modifiable within the technical scope described in the claims.

For example, in the above embodiments, the anode layer 5, the anode current collector 3, the solid electrolyte 8, and the like do not necessarily have to be rectangular or square, and may have any shape that suits the purpose, such as a circle or a polygon. Further, one anode composite does not necessarily have to have one anode layer 5, but may have more than one anode layers. Also, the anode composite does not necessarily have to be planar, and may be any other shape that suits the purpose, such as a three-dimensional shape.

Example 1

The following illustrate an example of charge and discharge experiments conducted on a lithium-air battery employing the structure of the anode composite 1 according to the first embodiment.

First, a description is given of a method for fabricating the anode composite 1 (see FIG. 1), a cathode, and a lithium-air battery using these that are used in this Example 1.

In the metallic foil laminated film 2 used in this example, a PP (polypropylene) resin was used for the resin layer 21, an Al (aluminum) foil for the metallic foil layer 22, and a PET (polyethylene terephthalate) resin for the resin layer 23. Further, a 2 cm×2 cm rectangular piece in the center portion of the metallic foil laminated film 2 was punched out to provide the opening 4. Next, a 2.5 cm×2.5 cm rectangular solid electrolyte 8 (LATP) was stacked onto the lower side of the metallic foil laminated film 2 to plug the opening 4. With an adhesive sheet interposed therebetween, the four sides of the solid electrolyte 8 were heat-sealed to the metallic foil laminated film 2 using a heat sealer.

Meanwhile, the anode 30 (see FIG. 2) was fabricated inside a glove box under an argon atmosphere. First, the anode current collector 3 having an acid-modified polypropylene film joined to its back surface was prepared (copper foil thickness: 10 µm, current collector size: 3 cm×3 cm). Then, on the front surface of it, metallic lithium (with a size of 1.45 cm×1.4 cm and a thickness of 200 µm) was stacked and then covered with the separator 7. Further, the four sides on the end portions of the separator 7 were heat-sealed to the anode current collector 3.

Then, the upper metallic foil laminated film 2, the anode 30, and the lower metallic foil laminated film 2 (one without the solid electrolyte opening 4) were stacked so that the solid electrolyte 8 may coincide with the anode layer 5 on the anode current collector 3. Then, three sides out of their peripheral portions were heat-sealed using a heat sealer. Further, from the one unsealed side, 1 ml of a non-aqueous electrolytic solution (1MLiTFSI/PC:EMC=1:1 in this example) was injected into the anode composite. Thereafter, the unsealed edge portion was joined by a heat sealer. The anode composite 1 in FIG. 1 was thus fabricated.

For the solid electrolyte, LATP (LICGC manufactured by OHARA INC.) was used. Further, as a separator for lithium-ion batteries, one made of a polyethylene resin and having a thickness of 20 µm, a pore size of 60 to 70 nm, a porosity of 42%, and an air permeance of 250 sec/100 cc was used.

Next, the cathode (not shown) was fabricated. First, 0.8 g of $MnO_2$ as a cathode catalyst, 0.1 g of Ketjenblack (specific surface area 800 $m^2/g$) as a conductivity aid, and 0.1 g of polytetrafluoroethylene (PTFE) as a binder were prepared. Then, they were mixed and kneaded in an agate mortar after 5 ml of ethanol was added as a dispersant.

Then, the mixed and kneaded product was sandwiched by two 2 cm×6 cm carbon cloths, rolled into 1-mm thickness and pressure-bonded by a roll press machine (Ultra-small Tabletop Hot Roll Press Machine manufactured by Hohsen Corp.). The mixed and kneaded product was pressure-bonded to a 2 cm×2 cm end portion of the carbon cloths, and the remaining part was removed. Thereafter, the above was let dry naturally in air for 24 hours. The cathode structure was thus fabricated.

Thereafter, the anode composite 1 and the cathode were disposed facing each other, to fabricate a lithium-air battery. Note that 1 ml of an aqueous electrolytic solution which is a 1:1 mixture of 3M (mol/L) of LiOH aqueous solution and 5M (mol/L) of LiCl aqueous solution was dropped onto a cellulose sheet, which was then placed between the anode composite 1 and the cathode.

Next, discharge and charge tests for this Example 1 are described.

Figure 9:
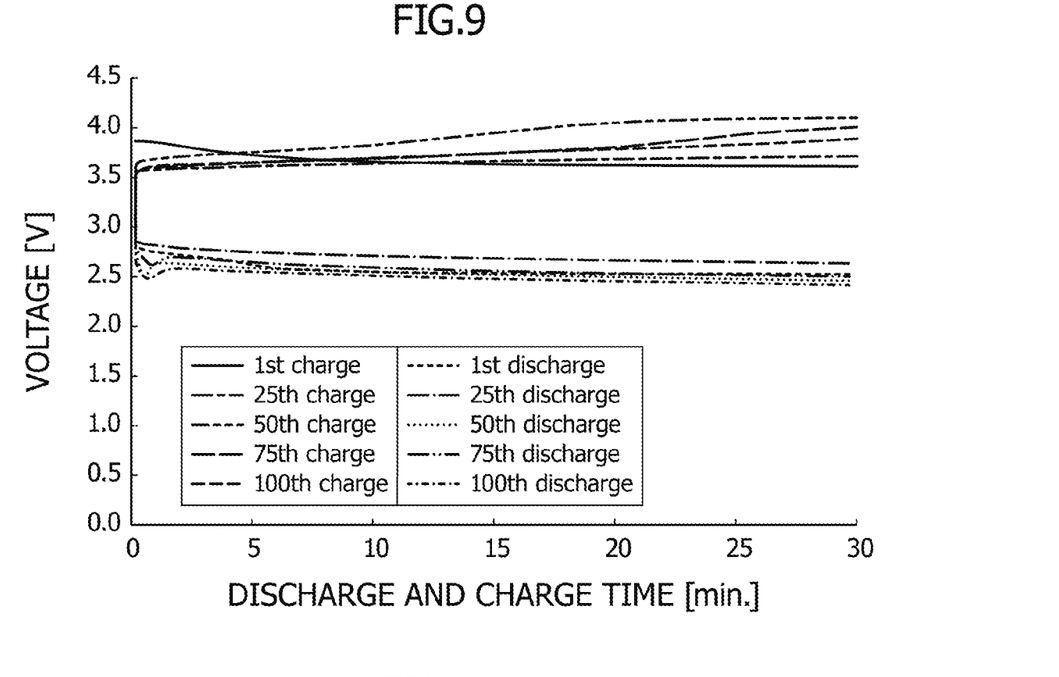
FIG. 9 is a graph depicting the relation between time and discharge and charge voltages of a lithium-air battery according to Example 1.

First, the above-fabricated lithium-air battery with a theoretical capacity of 84 mAh was subjected to repeated cycles of half an hour of discharge and half an hour of charge at a current density of 2 $mA/cm^2$ which is comparable to 0.05 C of the theoretical capacity. FIG. 9 demonstrates results of voltage shifts in this event at a temperature of 25° C., measured using HJ1001SD8 manufactured by HOKUTO DENKO CORP.

The results show that when the structure of the anode composite 1 for a lithium-air battery of Example 1 is used, stable voltages were obtained even after 100 cycles of charge and discharge.

Figure 8:
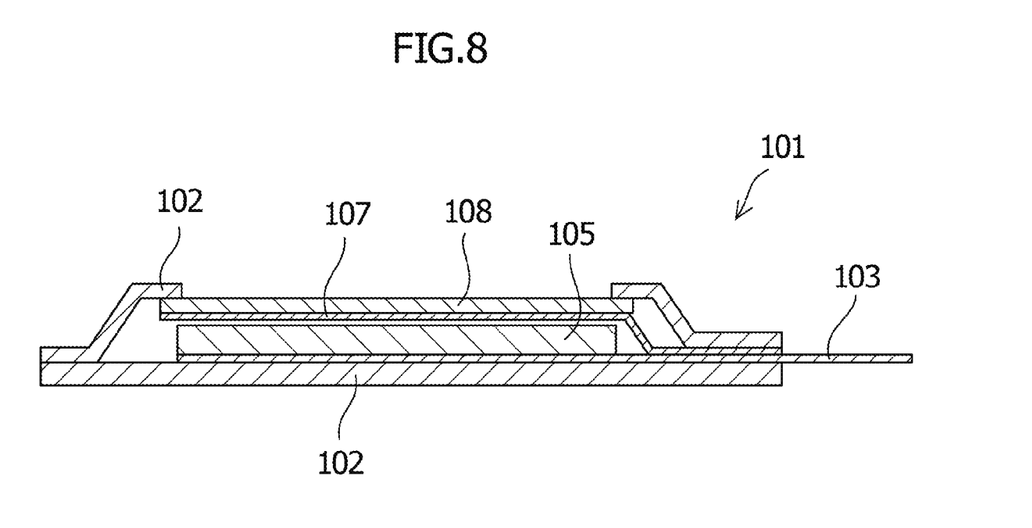
FIG. 8 is a sectional view of an example of an anode composite for a lithium-air battery not employing the present invention.
Figure 10:
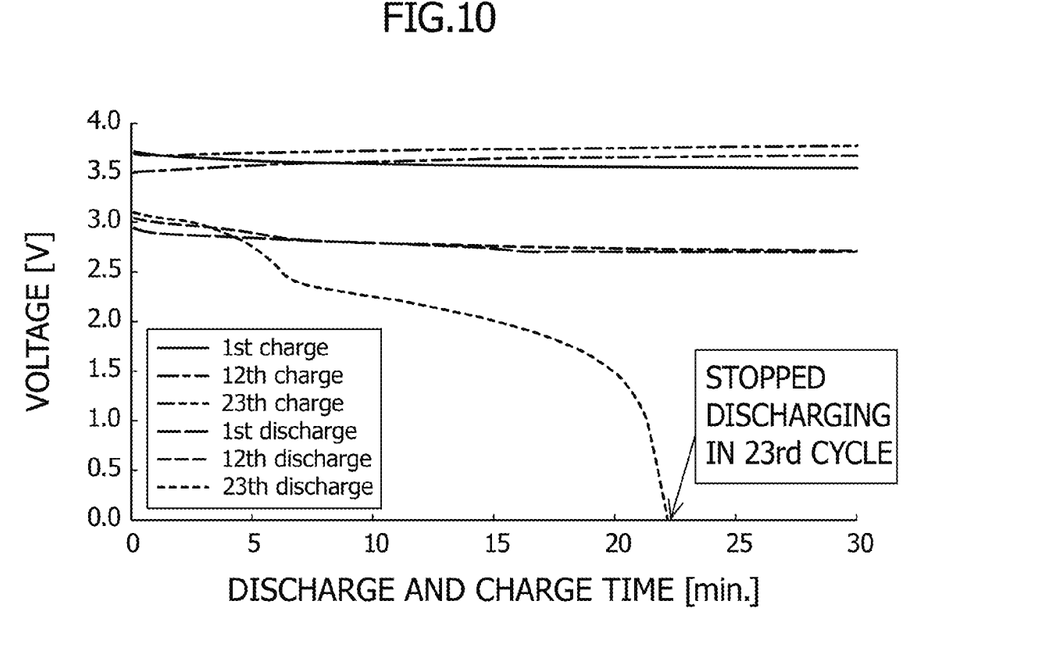
FIG. 10 is a graph depicting the relation between time and discharge and charge voltages of a lithium-air battery not employing the present invention.

For comparison, FIG. 10 demonstrates results of discharge and charge tests on a lithium-air battery not having the configuration of the present invention. FIG. 8 illustrates the structure of an anode composite 101 in the lithium-air battery used in the tests in FIG. 10. In the structure illustrated in FIG. 8, a separator 107 does not seal an anode layer 105 on an anode current collector 103.

The results in FIG. 10 demonstrate that the lithium-air battery illustrated in FIG. 8 not employing the configuration of the present invention stopped discharging after 23 cycles of charge and discharge.

Example 2

The following describe an example of charge and discharge experiments conducted on a lithium-air battery employing the structure of the anode composite 1d according to the fifth embodiment. First, a description is given of a method for fabricating the anode composite 1d (see FIG. 11), a cathode, and a lithium-air battery using these that are used in this Example 2.

In the metallic foil laminated film 2 in this example, a PP (polypropylene) resin was used for the resin layer 21, an Al (aluminum) foil for the metallic foil layer 22, and a PET (polyethylene terephthalate) resin for the resin layer 23. Further, a 2 cm×2 cm rectangular piece in the center portion of the metallic foil laminated film 2 was punched out to provide the opening 4. Next, the 2.5 cm×2.5 cm rectangular solid electrolyte 8 (LATP) was stacked onto the lower side of the metallic foil laminated film 2 to plug the opening 4. With an adhesive sheet interposed therebetween, the four sides of the solid electrolyte 8 were heat-sealed to the metallic foil laminated film 2 using a heat sealer.

Meanwhile, the anode 30 (see FIG. 2) was fabricated inside a glove box under an argon atmosphere. First, the anode current collector 3 having an acid-modified polypropylene film joined to its back surface was prepared (copper foil thickness: 10 µm, current collector size: 1.4 cm×10 cm). Then, on the front surface of it, metallic lithium (with a size of 1.45 cm×1.4 cm and a thickness of 200 µm) was stacked. Then, the conductive electron-conducting layer 10 was formed on the inner side of the separator 7 by Au vapor deposition, and the single separator 7 was folded near its center to wrap the current collecting portion 31. Then, one folded part and the other folded part of the separator 7 were heat-sealed to each other at the joined portions 73, which correspond to three sides of each of the folded parts: both end portions that are to stick out from the anode current collector 3 and an end portion where the anode current collector 3 is to be inserted. The separator 7 was thus formed into a bag and covered the current collecting portion 31. The anode 30 was thus integrally formed (see FIGS. 13 and 14).

Then, the upper metallic foil laminated film 2, the anode 30, and the lower metallic foil laminated film 2 (one without the solid electrolyte opening 4) were stacked so that the solid electrolyte 8 may coincide with the anode layer 5 on the anode current collector 3. Then, three sides out of their peripheral portions (parts without the tab of the anode current collector 3) were heat-sealed using a heat sealer. Further, from the one unsealed side, 1 ml of a non-aqueous electrolytic solution (4MLiFSI/EGDME in this example) was injected into the anode composite. Thereafter, the unsealed edge portion (the part with the tab of the anode current collector 3) was joined by a heat sealer. The anode composite 1d in FIG. 11 was thus fabricated. Note that the anode current collector 3 and the upper and lower jacket materials were heat-sealed with heat-seal sheets being interposed therebetween.

For the solid electrolyte, LATP (LICGC manufactured by OHARA INC.) was used. Further, as a separator for lithium-ion batteries, one made of a polyethylene resin and having a thickness of 25 μm, an average pore size of 0.03 μm or below, a porosity of 44%, and an air permeance of 450 sec/100 cc was used.

For the metallic foil in the triple-layer metallic foil laminated film 2 used in this example, an SUS foil or a copper foil may be used instead of Al. In addition, the outermost resin film of the metallic foil laminated film 2 is desirably a polyester resin film, such as a PET resin, having high thermal resistance and strength, or a nylon resin film. The innermost layer (the heat-seal layer) is desirably polyolefin resins such as a PE resin or a PP resin, which have low melting points, high hot workability, and high suitability for heat sealing. Further, instead of the PP resin/SUS foil/PET resin triple laminate sheet of this example, a metallic foil laminate film having four or more layers may be used which additionally includes one or more resin films such as nylon films between those three layers.

Next, the cathode (not shown) was fabricated. First, 0.8 g of $MnO_2$ as a cathode catalyst, 0.1 g of Ketjenblack (specific surface area 800 $m^2$/g) as a conductivity aid, and 0.1 g of polytetrafluoroethylene (PTFE) as a binder were prepared. Then, they were mixed and kneaded in an agate mortar after 5 ml of ethanol was added as a dispersant. A cathode material was thus made.

Then, this cathode material was divided into two parts, which were then placed on respective surfaces of a Ti mesh pressure-bonded part integrally having a 2.5 cm×2.5 cm pressure-bonded part and a 1 cm×5.5 cm tab portion and were pressed with a force of 20 kN to be pressure bonded. Then, the above was let dry naturally in air for 24 hours. The cathode structure was thus fabricated.

Thereafter, the anode composite 1d and the cathode were disposed facing each other, to fabricate a lithium-air battery. In the fabrication of the air battery, a mixture of LiOH and LiCl adjusted to pH of 10 or below was used as an aqueous electrolyte for the cathode. To hold the LiOH solution, 1.5 ml of the LiOH solution was dropped onto a 3 cm×3 cm polyacrylamide sheet, which was then placed between the anode composite 1d and the cathode.

Next, discharge and charge tests for this Example 2 are described.

First, the above-fabricated lithium-air battery with a theoretical capacity of 84 mAh was subjected to repeated cycles of two hours of discharge and two hours of charge at a current density of 2 mA/$cm^2$ which is comparable to 0.05 C of the theoretical capacity. Table 1 demonstrates results of voltage shifts in this event at a temperature of 25° C., measured using HJ1001SD8 manufactured by HOKUTO DENKO CORP.

TABLE 1

Outline of Results of Charge and Discharge Tests

| | Example | Comparative Example 1 | Comparative Example 2 |
|---|---|---|---|
| Cycle Characteristics | Excellent | Poor | Good |
| Number of Cycles | 170 or more | 23 | 125 |
| Generation of Dead Lithium after Cycles | Not generated | Generated | Not generated |
| State of Solid Electrolyte after Cycles | Not deteriorated | Deteriorated (Ruptured) | Not deteriorated |

The results show that when the structure of the anode composite 1d for a lithium-air battery of Example 2 is used, the charge and discharge cycle characteristics and stability are higher than those of the following comparative examples.

A comparative example is described below. The comparative example is basically the same as the anode composite 1d of Example 2, but uses a separator 7 which is not made to be conductive.

An anode composite of the comparative example is configured as follows. A jacket material formed by punching out of a 2 cm×2 cm rectangular center portion of a PP resin/Al foil/PET resin metallic foil laminated film, a punched-out acid-modified polypropylene film (an outer peripheral portion measuring 3 cm×3 cm, the inner periphery measuring 2 cm×2 cm), a 2.5 cm×2.5 cm rectangular solid electrolyte (LATP), and a punched-out, acid-modified polypropylene film (an outer peripheral portion measuring 3 cm×3 cm, the inner periphery measuring 2 cm×2 cm) were stacked in the order mentioned, and the four sides of the solid electrolyte were heat-sealed using a heat sealer. An upper jacket material was thus obtained.

An integrated anode of the comparative example was fabricated as follows in a glove box under an argon atmosphere. A metallic lithium anode layer (with a size of 1.45 cm×1.4 cm and a thickness of 200 μm) was joined to the front surface of a copper foil which was an anode current collector (the copper foil thickness: 10 μm, the current collector size: 1.4 cm×10 cm) having an integral terminal and having an acid-modified polypropylene film joined to the back surface thereof. A separator for lithium ion batteries was bent near its center, and its peripheral three sides were heat-sealed to make the separator bag-shaped. With the bag-shaped separator covering the anode layer and part of the anode current collector, the separator was heat-sealed to an end portion of the current collector at positions slightly outward of the copper foil.

Then, the upper jacket material, the integrated anode, a metallic foil laminated film (one without the solid electrolyte opening) as a lower jacket material were stacked with the solid electrolyte portion and the anode surface facing each other, and the three sides at the end portions were heat-sealed using a heat sealer. Thereafter, 1 ml of a non-aqueous electrolyte (4M (mol/l) LiFSI/EGDME) was injected into the anode composite from the unsealed end portion. Further, after the air inside was evacuated, the one last unsealed end portion (the portion with the tab of the anode current collector) was sealed using a heat sealer in an airtight manner. The anode composite of the comparative example was thus fabricated. Note that the anode current collector and the upper and lower jacket materials were heat-sealed with heat-sealing sheets made of an acid-modified PP resin or the like interposed. A method for fabricating a cathode, a method for fabricating an air battery, and a method for charge and discharge tests are the same as those used in Example 2.

REFERENCE SYMBOL LIST

1 Anode composite
1a Anode composite
1b Anode composite
1c Anode composite
1d Anode composite
1e Anode composite
1f Anode composite
2 Metallic foil laminated film
3 Anode current collector
3a Anode current collector
4 Opening
5 Anode layer
7 Separator
7a Separator
7b Separator
8 Solid electrolyte
9 Film
10 Electron-conducting layer
21 Resin layer
22 Metallic foil layer
23 Resin layer
24 Resin layer
30 Anode
31 Current collecting portion
32 Terminal portion
73 Joined portion
74 Heat-sealing sheet
75 Non-joint portion
76 Joined portion
101 Anode composite
102 Metallic foil laminated film
103 Anode current collector
105 Anode layer
107 Separator
108 Solid electrolyte

The invention claimed is:

1. An anode composite structure for a lithium-air battery, comprising:
    an anode current collector;
    an anode layer stacked on the anode current collector, the anode layer being metallic lithium, an alloy containing lithium as a main component, or a chemical compound containing lithium as a main component; and
    a separator stacked on the anode layer, wherein
    the anode layer is sealed along a portion of the structure that is located outside of the anode layer and surrounds the anode layer, the separator and the anode current collector being joined to one another along the entirety of the portion so that the separator and the anode current collector are connected by a seal to form a joined structure around the anode layer that surrounds the anode layer and serves to isolate the anode layer from an electrolyte of the battery.

2. The anode composite structure for a lithium-air battery according to claim 1, wherein
    the anode current collector is plate-shaped,
    the anode layer is disposed on one of surfaces of the anode current collector; and
    the other one of the surfaces of the anode current collector is covered with a substance that does not conduct lithium ions.

3. The anode composite structure for a lithium-air battery according to claim 1, wherein
    the anode layer is stacked on a surface of the anode current collector over a range smaller than an area of the anode current collector.

4. The anode composite structure for a lithium-air battery according to claim 1, comprising an electron-conducting layer on an inner side of the separator.

* * * * *

UNITED STATES PATENT AND TRADEMARK OFFICE
CERTIFICATE OF CORRECTION

PATENT NO. : 10,622,691 B2  
APPLICATION NO. : 16/086531  
DATED : April 14, 2020  
INVENTOR(S) : Khalilur Rahman et al.

Page 1 of 1

It is certified that error appears in the above-identified patent and that said Letters Patent is hereby corrected as shown below:

On the Title Page

Item (72), Inventor Number 4, Hironari Minami's City of Residence, should read, Hamamatsu (JP)

Signed and Sealed this  
Eleventh Day of August, 2020

Andrei Iancu  
*Director of the United States Patent and Trademark Office*